United States Patent Office 2,749,312
Patented June 5, 1956

2,749,312

MODIFIED POLYMERIC POUR POINT DEPRESSANTS

William C. Hollyday, Jr., Fanwood, N. J., assignor to Esso Research and Engineering Company, a corporation of Delaware No Drawing. Application May 23, 1952,
Serial No. 289,680

9 Claims. (Cl. 252—50)

This invention relates to lubricating compositions containing additive materials and methods for the preparation thereof. Particularly the invention relates to pour point depressing and viscosity index improving materials which comprise oil soluble polymers containing nitrogen. More particualrly the invention relates to pour point depressants and viscosity index improvers which consist essentially of the reaction product of a long chain aliphatic amine with a polymerized vinyl compound.

Polymers of vinyl chloride and copolymers of vinyl chloride with other polymerizable materials have outstanding utility in the art of plastics, resins and the like. These materials are easily prepared by methods known to the art usually involving a simple polymerization process and are commercially available in large quantities. They have not been found to have general utility in lubrication, however, because they are generally oil insoluble.

It has now been found and forms the object of this invention that these polymers of vinyl chloride and copolymers of vinyl chloride with other polymerizable agents may be reacted with long chain aliphatic amines to form compositions which are oil soluble and are useful as addition agents for mineral oils. The materials of the invention have the desirable property of improving the rate of change of viscosity with temperature of oils with which they are blended, and, in addition, have the characteristic of depressing the temperature at which a mineral lubricating oil loses its properties of free flow; in other words the reaction products according to the concept of this invention are useful as pour point depressants and viscosity index improvers.

The polymer or copolymer which is used as a starting material for the preparation of the materials of this invention may be represented by the following formula:

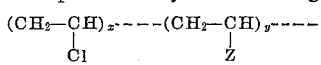

In the formula above, Z represents either chlorine or

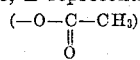

an acetate radical, and $x$ and $y$ are whole numbers varying between about 30 and 1,000. When Z is chlorine the formula above covers the polyvinyl chlorides and when Z is an acetate radical the formula covers copolymers of vinyl chloride and vinyl acetate. The materials which are operable in the concept of this invention give products which have molecular weights of between about 3,000 and about 100,000 Staudinger. It is not possible to measure the molecular weights of the starting materials because of low and incomplete solubility in almost all solvents. If it is assumed there is no breakdown during amination, the starting materials would have molecular weights of between 1,800 and 60,000. The values of $x$ and $y$, therefore, will depend upon the molecular weight of the starting material alone when Z is chlorine and upon the combining ratio of the vinyl chloride and vinyl acetate in addition to the molecular weight of the copolymer when Z is an acetate radical. In the preferred embodiment of this invention $x$ and $y$ are such that the molecular weight is between about 3,000 and 30,000 as estimated.

The polymer or copolymer as described above is reacted with an aliphatic amine having from about 6 to about 20 carbon atoms to form the additive materials of this invention. These aliphatic amines may be either of branched chain or straight chain configuration, preferably straight chain and may be either primary or secondary amines or mixtures thereof. Especially useful mixtures of amines which are now commercially available are known as "Armeens" and are a mixture of amines of from 8 to 18 carbon atoms.

The formation of the additive material of this invention is straight forward and involves the reaction of the polymeric material with the amine in a manner so as to obtain HCl as a by-product. The reaction may be carried out in the presence of a solvent such as methanol, benzene or xylene and at a temperature within the range from about 150° F. and 300° F. Additional heating after partial or complete removal of the solvent, at temperatures up to 450° F. over a short time, may be desirable. The time of reaction will depend both upon temperature and the starting material used and it ordinarily will be completed within about 3 to 15 hours. The reaction product may be purified by any of the methods known to the art such as extraction with a solvent, precipitation from solution with a non-solvent, treating solution with alkali, clay or charcoal, filtering solution, etc.

The resulting pour point depressing additive material may be blended with any mineral base lubricating oil in amounts varying from about 0.001% to about 10% by weight based on the weight of the total composition. Optimum proportions, however, will usually be between 0.01 and 5% by weight.

To more explicitly define the instant invention the following examples are set out.

EXAMPLE 1

To 300 ml. of methanol were added 30 g. of commercial vinyl chloride-vinyl acetate copolymer containing about 50% chloride (Vinylite VYLF) and 90 g. of a mixture of $C_8$ to $C_{18}$ primary alkyl monoamines, wherein the alkyl group is derived from coconut oil acids and having an average molecular weight of 200 (Armeen CD). This reaction mixture was refluxed for 15 hours and then the methanol was evaporated on the steam bath. The residue was heated at 300° F. for one hour. At the end of this time the residue was cooled, dissolved in hexane, and the hexane solution was washed with 20% sodium hydroxide. After washing, the hexane was evaporated and the residue was thoroughly extracted with methanol. There were recovered 68 g. of unreacted amine and 1.9 g. of unreacted copolymer. The yield of methanol-insoluble, oil-soluble product was 35 grams. This product contained 3.34% nitrogen and 14.20% chlorine, which indicated that it contained about 54% vinyl amine units

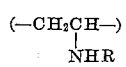

25% vinyl chloride units

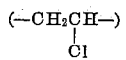

and 21% vinyl acetate units

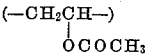

or hydrocarbon residue. This product was tested as a pour depressant with the results given in the table.

EXAMPLE 2

A material was prepared similar to Example 1 except a commercial polyvinyl chloride containing about 57% chlorine (Vinylite QYNA) was reacted with the same amine mixture used in Example 1 (Armeen CD) in the presence of benzene as the solvent. The product contained 3.66% nitrogen and 0.23% chloride indicating that it consisted of about 59% vinyl amine units, the rest being mostly hydrocarbon residue. This product was tested as a pour depressant (table).

EXAMPLE 3

A second material was prepared similar to Example 2 except that polyvinyl chloride (Vinylite QYNA) was reacted with a mixture of $C_8$ to $C_{18}$ secondary alkyl monoamines, wherein the alkyl group is derived from coconut oil acids and having a molecular weight of about 435 (Armeen 2C) in the presence of xylene as the solvent. The product was a pour depressant (table).

TABLE 1

*Polyamines as pour depressants* [1]

| Example No. | Reactants | | ASTM Pour Point, °F. at Wt. Percent Active Ingredient Indicated | | | |
|---|---|---|---|---|---|---|
| | Polymer | Amine | 0.00 | 0.02 | 0.05 | 0.10 |
| 1 | Vinyl Chloride-Acetate. | Primary | +15 | −15 | −15 | −15 |
| 2 | Vinyl Chloride | do | +15 | 0 | −5 | −5 |
| 3 | do | Secondary | +15 | −5 | −10 | −10 |

[1] Test oil: Mid-Continent SAE 20 grade, vis./210° F. 54.4 S. U. S.; viscosity index 97.7.

An examination of the data in the table above points out the pour depressant potency of the materials of this invention.

To summarize briefly this invention relates to oil-soluble nitrogen containing materials having the characteristic of depressing the pour point and improving the viscosity index of mineral lubricating oils into which they have been incorporated which consists essentially of the reaction product of a polymer of vinyl chloride or a copolymer of vinyl chloride and vinyl acetate with an aliphatic amine capable of reacting therewith and having from about 6 to about 20 carbon atoms per molecule and mixtures thereof, the final product having a molecular weight within the range of from about 3,000 to about 100,000.

What is claimed is:

1. A lubricating oil additive material having the characteristic of depressing the pour point of mineral lubricating oils with which it is blended which consists essentially of the reaction product of an aliphatic monoamine having from 6 to 20 carbon atoms per molecule selected from the class consisting of primary monoamines, secondary monoamines and mixtures thereof with a material having the general formula $$(CH_2-CH)_x----(CH_2-CH)_y----$$
$$\quad\quad |\quad\quad\quad\quad\quad\quad\quad |$$
$$\quad\quad Cl\quad\quad\quad\quad\quad\quad\quad Z$$

wherein Z is selected from the class consisting of chlorine and $$(-O-\underset{\underset{O}{\|}}{C}-CH_3)$$

and wherein $x$ and $y$ are whole numbers, wherein said reaction product contains vinyl amine units having the structure $$(-CH_2-CH-)$$
$$\quad\quad\quad |$$
$$\quad\quad\quad NHR$$

and HCl is formed as a byproduct, said reaction product having a molecular weight within a range of 3,000 to 100,000 and is oil soluble.

2. A lubricating oil additive material according to claim 1 wherein Z is —Cl.

3. A lubricating oil additive material according to claim 1 wherein Z is $$-O-\underset{\underset{O}{\|}}{C}-CH_3$$

4. A lubricating oil additive material consisting essentially of a reaction product of a homopolymer of vinyl chloride and a mixture of primary aliphatic monoamines having from 8 to 18 carbon atoms wherein said reaction product contains vinyl amine units having the structure $$(-CH_2-CH-)$$
$$\quad\quad\quad |$$
$$\quad\quad\quad NHR$$

and HCl is formed as a byproduct, said reaction product having a molecular weight within a range of from about 3,000 to about 100,000 and is oil soluble.

5. A lubricating composition which comprises a lubricating oil base stock containing combined therein a minor but pour point depressing proportion of the reaction product of an aliphatic monoamine having from 6 to 20 carbon atoms per molecule selected from the class consisting of primary monoamines, secondary monoamines and mixtures thereof with a material having the general formula $$(CH_2-CH)_x----(CH_2-CH)_y----$$
$$\quad\quad |\quad\quad\quad\quad\quad\quad\quad |$$
$$\quad\quad Cl\quad\quad\quad\quad\quad\quad\quad Z$$

wherein Z is selected from the class consisting of chlorine and $$-O-\underset{\underset{O}{\|}}{C}-CH_3$$

and wherein $x$ and $y$ are whole numbers, wherein said reaction product contains vinyl amine units having the structure $$(-CH_2-CH-)$$
$$\quad\quad\quad |$$
$$\quad\quad\quad NHR$$

and HCl is formed as a byproduct, said reaction product having a molecular weight within a range of 3,000 to 100,000.

6. A lubricating oil composition according to claim 5 wherein Z is —Cl.

7. A lubricating oil composition according to claim 5 wherein Z is $$-O-\underset{\underset{O}{\|}}{C}-CH_3$$

8. A lubricating oil composition which comprises a lubricating oil base stock containing combined therein from about 0.001% to about 10.0% by weight, based on the weight of the total composition of a reaction product of a homopolymer of vinyl chloride and a mixture of primary aliphatic monoamines having from 8 to 18 carbon atoms wherein said reaction product contains vinyl amine units having the structure $$(-CH_2-CH-)$$
$$\quad\quad\quad |$$
$$\quad\quad\quad NHR$$

and HCl is formed as a byproduct, said reaction product having a molecular weight within a range of from about 3,000 to about 100,000.

9. A lubricating oil composition which comprises a mineral oil base stock containing combined therein from about 0.001% to about 10.0% by weight based on the weight of the total composition of a reaction product of a copolymer of vinyl chloride and vinyl acetate and a mixture of primary aliphatic monoamines having from 8 to 18 carbon atoms wherein said reaction product contains vinyl amine units having the structure $$(-CH_2-CH-)$$
$$\quad\quad\quad |$$
$$\quad\quad\quad NHR$$

and HCl is formed as a byproduct, said reaction product having a molecular weight within a range of from about 3,000 to about 100,000.

References Cited in the file of this patent

UNITED STATES PATENTS

| | | |
|---|---|---|
| 2,103,581 | Gray | Dec. 28, 1937 |
| 2,176,903 | Izard | Oct. 24, 1939 |
| 2,304,637 | Hardy | Dec. 8, 1942 |
| 2,404,781 | Arnold et al. | July 30, 1946 |
| 2,451,174 | Reuter | Oct. 12, 1948 |
| 2,615,845 | Lippincott et al. | Oct. 28, 1952 |
| 2,624,725 | Bjorksten et al. | Jan. 6, 1953 |
| 2,698,316 | Giammaria | Dec. 28, 1954 |

FOREIGN PATENTS

| | | |
|---|---|---|
| 969,154 | France | May 17, 1950 |